Jan. 22, 1957 P. F. ROYET 2,778,268
KINEMATOGRAPHIC MULTI-OBJECTIVE CAMERA
Filed Jan. 21, 1953 6 Sheets-Sheet 1

*Fig.1*

Inventor
Paul Ferdinand Royet
By Richardson, Davidand Norton
his ATTys.

Jan. 22, 1957 P. F. ROYET 2,778,268
KINEMATOGRAPHIC MULTI-OBJECTIVE CAMERA
Filed Jan. 21, 1953 6 Sheets-Sheet 5

Fig. 5

*Inventor*
Paul Ferdinand Royet
By Richardson, Davis and Norton
his ATTYS

2,778,268
Patented Jan. 22, 1957

2,778,268

KINEMATOGRAPHIC MULTI-OBJECTIVE CAMERA

Paul Ferdinand Royet, Aurec-sur-Loire, France

Application January 21, 1953, Serial No. 332,426

Claims priority, application France February 2, 1952

14 Claims. (Cl. 88—16)

My invention has for its object improvements in kinematographic multi-objective cameras with a view to obtaining selectively photographs through any of the objectives according to the desired kind of photograph to be obtained.

Different objectives are used in practice for obtaining a modification in the focal distance in accordance with the taking of views at different distances by kinematographic cameras. In certain kinematographic cameras, these different objectives are removable and may for instance be secured through screwing or by means of a bayonet joint. In other cameras, the objectives are carried permanently on rotary turrets or else on sliders and brought selectively into operation.

In all prior arrangements of such types, it is necessary to execute a separate operative step for bringing the desired objective into register with the single gate through which the film passes.

In order to cut out the necessity of such an operation, I have designed a kinematographic camera including at least two gates located in sequential relationship along the path followed by the film and the spacing between which corresponds to an exact multiple of the spacing between two pictures, an objective being permanently secured in register with each gate while a shutter that allows using selectively either objective is controlled simultaneously with the starting of the camera mechanism by means of one or more knobs, handles, levers or the like control means.

In a preferred embodiment, the shutter adapted to close alternately either of the two gates registering respectively with the optical axes of the two objectives, is carried slidingly in a plane parallel with the path followed by the film, each movement of said shutter being controlled by a push-button producing simultaneously the shifting of the film by a length such that the unimpressed areas are done away with as well as twice impressed areas, as might occur by reason of the change of the axis along which the views are taken.

In such a case, the normal view-taking shutter assuming a reciprocating movement is advantageously provided with two gates, the spacing between which is equal to the spacing between the optical axes of the two objectives. The associated objective-selecting shutter according to my invention is then positioned in a plane that is preferably parallel with the above-mentioned normal shutter and it is provided with a single gate adapted to register selectively with one of the gates corresponding to the two objectives, said objective-selecting shutter being rigid with a plate carrying the presser plate and to which is pivotally secured a lever rigid with a claw engaging, during the objective-changing period, a perforation of the film whereby the latter may be shifted by a length corresponding to the displacement of the plate and consequently of the shutter. This carrier plate is attached to a pivoting lever pivotally secured to a rocking lever: the system thus provided is submitted to the action of a spring which urges it into either of the two view-taking positions, the rocking of the last mentioned lever being obtained through a shifting of a push-button, the inner end of which acts on said rocking lever while its opposite end is operatively connected with the associated push-button so that the latter is caused to slide in a direction opposed to the movement of the first push-button; the two push-buttons carry each two stops of which one acts on the carrier of the film-engaging claw so as to release the claw at the beginning of the movement of the push-button while the other stop releases the mechanism of the camera as it arrives at the end of its stroke on said push-button.

I have illustrated by way of example in accompanying drawings two preferred embodiments of a kinematographic camera with two objectives executed in accordance with my invention. In said drawings.

In said drawings, illustrating the control mechanism, 25 designates the casing of a camera including in superposed relationship an ordinary objective 26 and a telephoto objective 27. In register with said two objectives, the casing 25 includes three walls that are parallel with one another and are provided in register with the axes of said objectives with gates respectively at 28 and at 29, said walls defining with one another two chambers 31 and 32. Inside the chamber 31 is housed the conventional shutter 33, the reciprocation of which is controlled by the camera mechanism while inside the chamber 32 is housed the selecting shutter 34 which allows the view-taking through either of the objectives 26 and 27 as desired. The conventional shutter 33 is provided with two apertures 35 the spacing between which corresponds to the spacing between the axes of the objectives 26 and 27. The selecting shutter 34 is provided in contradistinction with a single aperture 36 which, according as to whether the view is to be taken through the normal objective 26 or through the telephoto-objective 27, is shifted into register with either of said objectives.

The conventional shutter 33 is pivotally connected through its lower end to a link 37 connected with a wheel 38 the rotation of which is controlled by the camera mechanism.

The selecting shutter 34, that is adapted to move inside the chamber 32 of the camera casing, is rigid with a transverse plate 39 carrying the presser plate 41 which is submitted to the pressure of a spring 42 and urges consequently the film 40 against the inner wall of the casing 25. Said transverse plate 39 carries furthermore a stud 43 to which is pivotally secured a lever 44 carrying a tooth 45 forming a claw adapted to engage the film 40 when the operator wishes to shift the arrangement between the positions providing for view taking through either objective; for this purpose, the lever 44 is submitted to the pressure of a spring 46 bearing against a stationary stop 47 rigid with the transverse plate 39.

Figure 2:
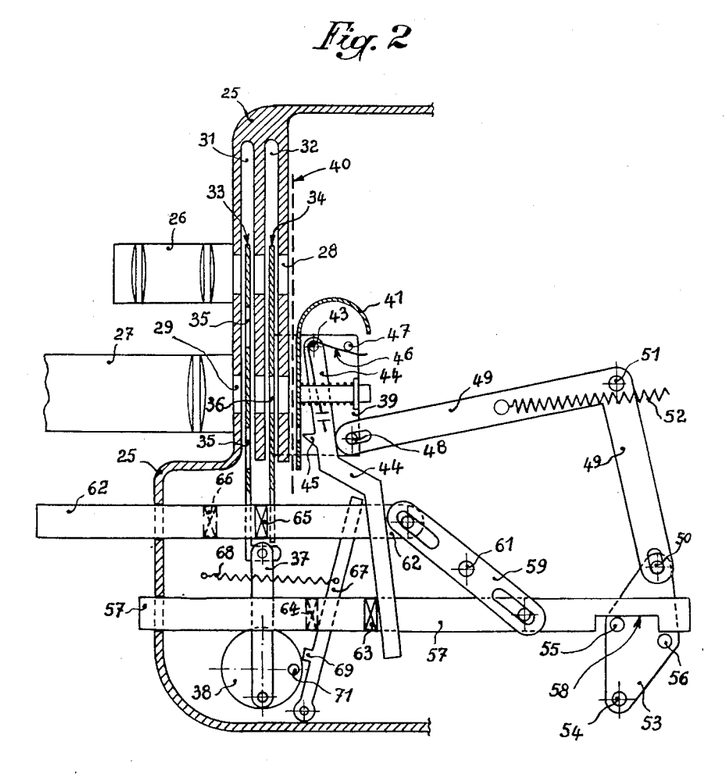
Figure 3:
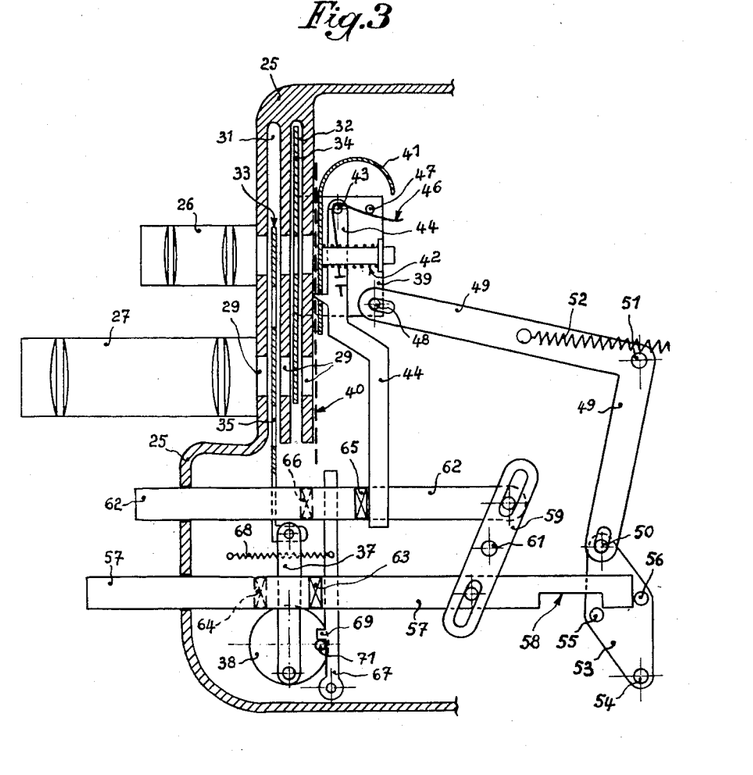
Figs. 3 and 4 are similar views corresponding to the taking of views through the other objective.
Figure 4:
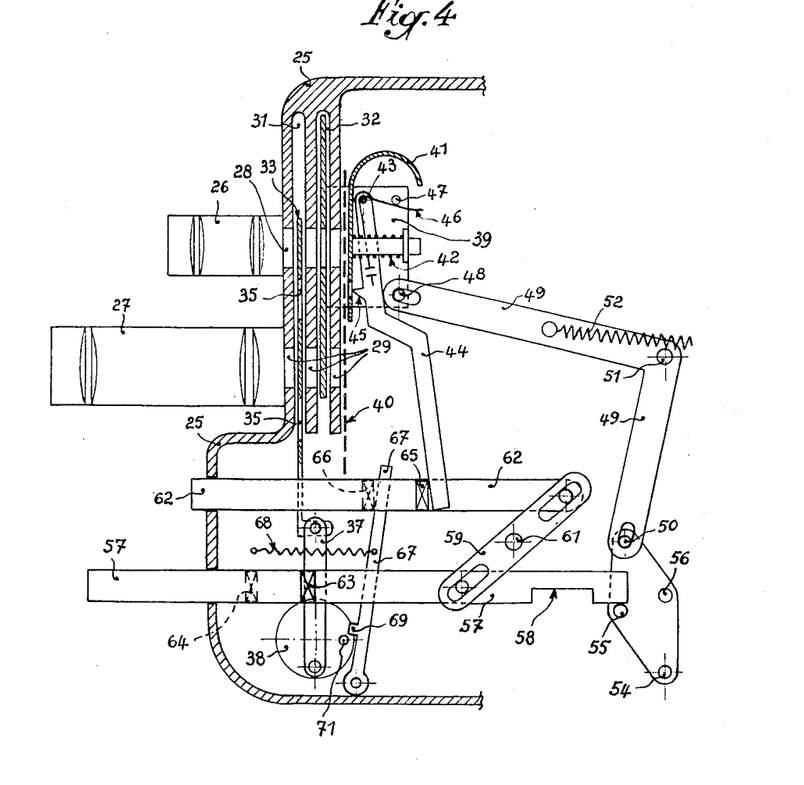
Figure 5:
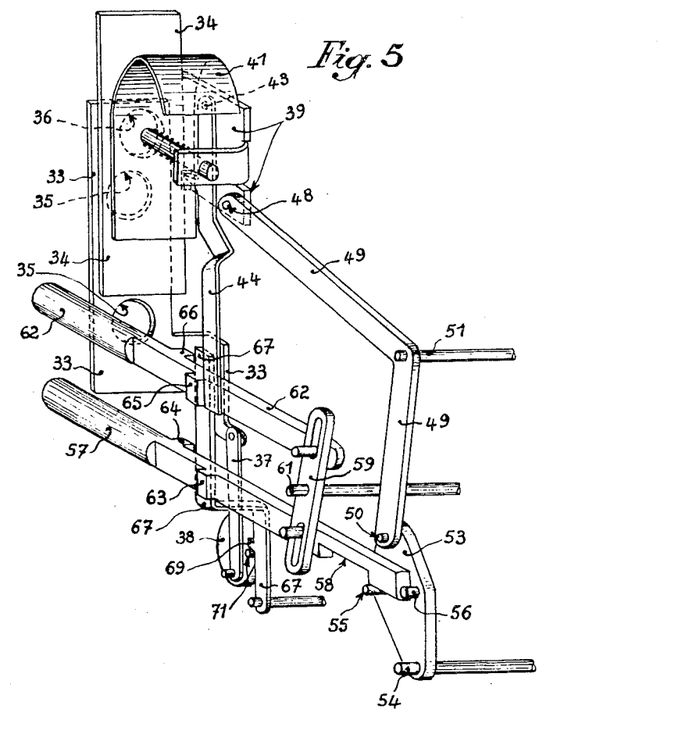
Fig. 5 is a perspective view of the control system of the arrangement in a position corresponding to that of Fig. 3.

In order that the view-taking may be performed through either of the objectives 26 or 27, it is necessary to shift the member constituted by the plate 39 and the selecting shutter 34 so that the gate 36 in the latter may register as desired with either of the gates 28 or 29 corresponding to the objective 26 or to the telephoto objective 27 respectively. For this purpose, the plate 39 is pivotally connected through a pivot 48 at its lower end with a bell crank 49 the apex of which pivots round a stationary point 51, said bell-crank being submitted to the tractional stress exerted by a spring 52; the outer end of the latter is secured to a stationary point such that said spring constrains said bell crank to occupy either of two extreme positions as provided by the relative position of the pivot 51 of the bell-crank and of the line of action of the spring 52 secured to said bell-crank; one of said positions of the bell-crank is that illustrated in Figs. 1 and 2 while the other is shown in Figs. 3 and 4. The outer end of the bell-crank 49 is pivotally secured at 50 to a rocker 53 pivoting round a stud 54 and carrying two projecting pins respectively at 55 and 56.

The pivotal movement of said rocker 53 is obtained through action on said projections 55 and 56 of a lever 57 provided for this purpose with a lateral elongated notch 58, said lever extending beyond the walls of the casing 25 so as to form a push-button. A link 59 adapted to pivot round a stationary point 61 pivotally connects said lever 57 with a further lever 62 which also projects beyond the wall of the casing 25 so as to form a second push-button.

The first push-button lever 57 carries two stops respectively at 63 and at 64 while the second push-button lever 62 carries similarly two stops 65 and 66. The two above-mentioned levers 57 and 62 and the corresponding stops 63, 64, 65, 66 are located in a manner such that the operation of the mechanism may be that disclosed hereinafter.

Figure 1:
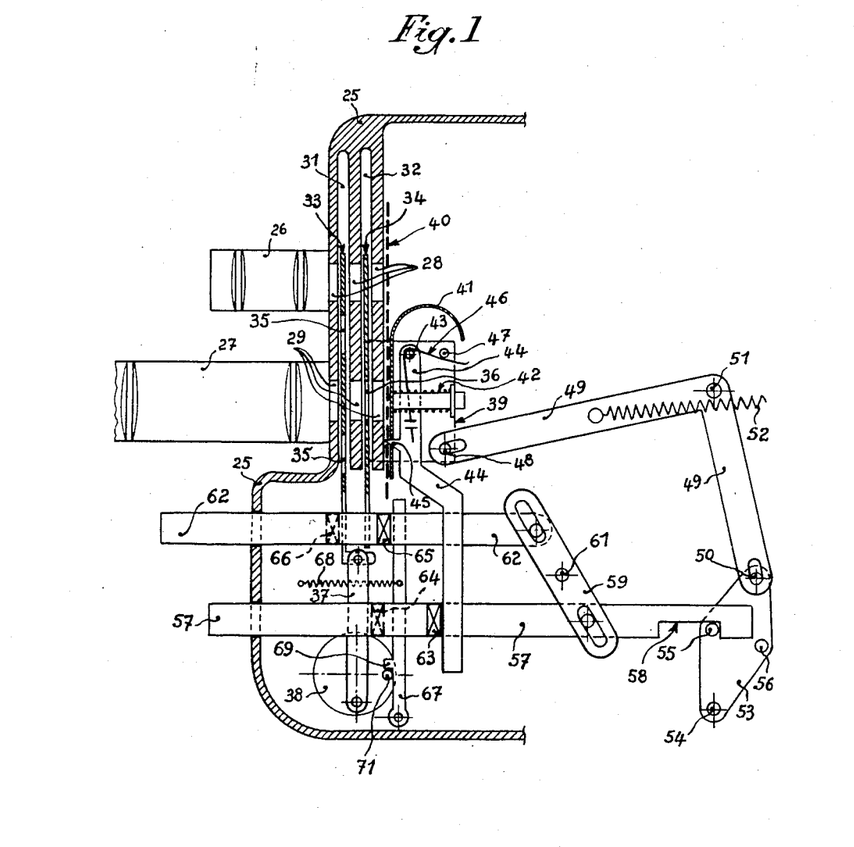
Figs. 1 and 2 are vertical sections of a preferred embodiment of my improved kinematographic camera respectively during the first stage and during the second stage of the view-taking operations through one of the objectives.

The arrangement is shown in the position illustrated in Fig. 1 in its inoperative position just preceding the taking of a view through the telephoto-objective 27; as a matter of fact, the aperture 36 in the selecting shutter 34 is located in register with the axis of the gate 29 corresponding to the telephoto-objective 27 (Fig. 1). To take a view, it is sufficient for the operator to urge home the push-button 57 so as to bring it into the position illustrated in Fig. 2. This depression exerted on the push-button 57 produces through the stop 63 a pivotal movement of the lever 44 round its pivot 43 so that the claw 45 releases the perforation in the film 40 (Fig. 2). This being done, the push-button 57 depresses through its second stop 64 the pivoting lever 67 which is normally submitted to the tractional stress of a spring 68 and which now releases through its lateral projection 69 the projection 71 on the wheel 38 that is operatively connected with the mechanism of the camera (Fig. 2). Said projection 71 being thus released, the wheel 38 begins revolving and produces through the link 37 a reciprocatory movement of the conventional shutter 33 and consequently a series of view-taking operations through the aperture 35 in the shutter 33, which aperture 35 is adapted to register with the gate 29 in the casing 25 (Fig. 2) and also with the position assumed by the aperture 36 in the selecting shutter 34. Thus and as illustrated in Fig. 2, the arrangement is in its view-taking position with reference to the telephoto-objective 27.

If the operator wishes now to take views through the normal objective 26, it is sufficient to depress the other push-button 62. In a first stage of this depression, the push-button 62 is brought from the position illustrated in Fig. 2 to that illustrated in Fig. 3. The inward shifting of said push-button 62 produces a pivotal movement of the link 59 round the spindle 61 which leads to a reverse shifting of the push-button 57. During this displacement, performed in the rear to front direction, the push-button 57 produces through the rear end of its notch 58 a drive of the projection 55 and consequently a pivotal movement of the rocker 53 round its pivot 54 (Fig. 3). The rocker in its turn transmits its rocking movement to the lever 49 which under the action of the spring 52 passes suddenly from its extreme position of rest illustrated in Fig. 2 to that illustrated in Fig. 3. Consequently the plate 39 and the selecting shutter 34 rigid therewith, are shifted from the position corresponding to view-taking through the telephoto-objective 27 to the position corresponding to view-taking through the conventional objective 26 (Fig. 3). However, during the depression of the push-button 62 and consequently during the return movement of the push-button 57, the lever 44 carrying the film-engaging claw 45 (Fig. 3) pivots simultaneously under the action of the spring 46, this being obtained by reason of the fact that the stop 63 on the push-button 57 no longer holds the lever 44 in its operative position. The claw 45 engages then a perforation of the film 40 facing it (Fig. 3). Said film is shifted simultaneously with the plate 39 and progresses through the same distance during said depression exerted on the push-button 62. This arrangement prevents any impression on the film throughout a length equal to the spacing between the two objectives 26 and 27.

Now, in the position illustrated in Fig. 3, the camera is not in its operative position. As a matter of fact and as in the case of Fig. 1, it occupies an intermediate position. In order to take a view through the normal objective 26, it is sufficient to continue depressing the push-button 62 in order to bring it from the position illustrated in Fig. 3 into the final position illustrated in Fig. 4. During this last mentioned operative step, the stops 65 and 66 release in succession respectively the claw 45 engaging the film and the lever 67 holding the wheel 38 at a standstill (Fig. 4).

The operation of either objective 26 and 27 is thus performed very speedily without any stoppage of the viewfinding and without any substantial stoppage in the view-taking operation.

Figure 6:
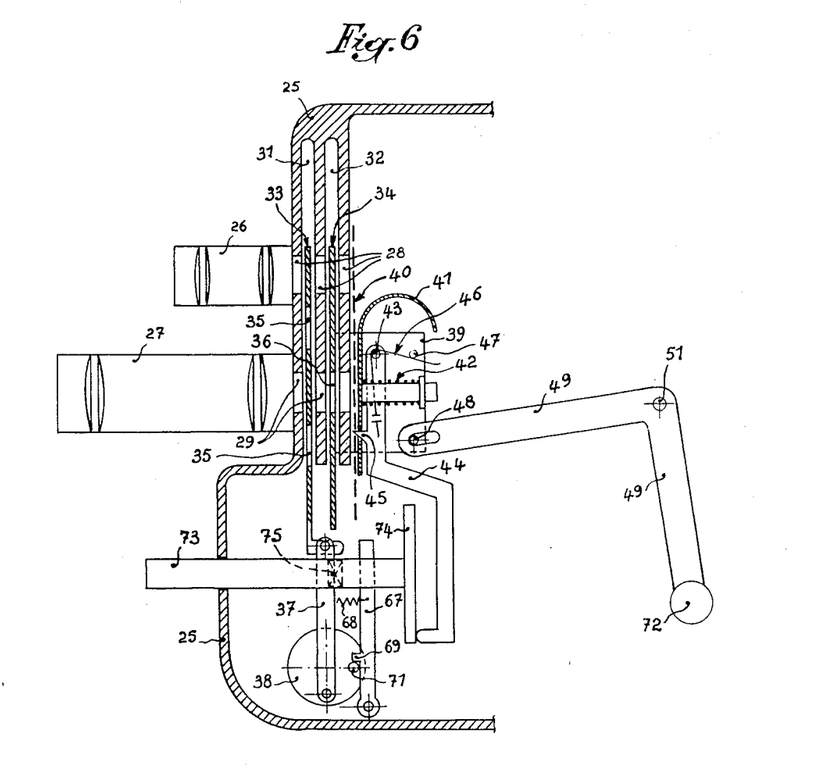
Fig. 6 shows a last embodiment of said control system.

In the modification illustrated in Fig. 6, the positioning of the plate 39 and of the selecting shutter 34 is performed through direct actuation of the pivoting lever 49 which is provided for this purpose with a control knob 72 at its outer free end. The release of the gearwork is controlled by a single push-button 73 carrying the stops 74 and 75 (Fig 6). The stop 74 acts first so as to release the film-retaining claw 45 while the stop 75 acts immediately afterwards on the lever 67 so as to release the gearwork of the camera.

What I claim is:

1. In a kinematographic multi-objective camera, the combination of a film guideway, at least two objectives registering with the guideway and the spacing of which is equal exactly to a multiple of the spacing between two successive film pictures, a view-taking shutter adapted to assume a reciprocating movement over the film guideway and provided with gates adapted to register with the corresponding objectives during said reciprocating movement, a shiftable selecting shutter moving in a plane parallel to the first view-taking shutter longitudinally of the film guideway and provided with one gate adapted to selectively uncover the location of one objective according to the position assumed by the selecting shutter, a gearwork controlling the progression of the film along its guideway and the operation of the view-taking shutter, a part adapted to lock said gearwork against operation, means urging the locking part into its operative position, a member carried by the selecting shutter and adapted to engage the film for urging it into movement in unison with the shifting of the selecting shutter, spring means urging said last mentioned member into its operative position, and hand-operable means adapted to mechanically provide for the shifting of the sliding shutter and for the operation of the locking part and of the film engaging member.

2. In a kinematographic multi-objective camera, the combination of a film guideway, two objectives registering with the guideway and the spacing of which is equal exactly to a multiple of the spacing between two successive film pictures, a view-taking shutter including two gates, the spacing between which is equal to the spacing between the corresponding objectives, means for moving said view-taking shutter to bring periodically the two gates into register with the objectives, a shiftable selecting shutter moving in a plane parallel to the first view-taking shutter and provided with one gate adapted to selectively uncover the location of one objective according to the position assumed by the selecting shutter, a gearwork controlling the progression of the film along its guideway and the operation of the view-taking shutter, a part adapted to lock said gearwork against operation, means urging the locking part into its operative position, a presser-plate rigidly secured to the selecting shutter and parallel therewith, a film-engaging claw, a stud rigid with the selecting shutter and with the presser plate and to which said claw is pivotally secured to move in a plane perpendicular to the plane of the film in the guideway, means urging said claw into operative engagement with the film perforations, and hand-operated means adapted to shift last mentioned means away from its operative position and to urge the gate-selecting shutter into its different gate-uncovering positions, said last-mentioned means urging the claw away from its operative position before shifting the said last-mentioned locking part away from the operative position.

3. In a kinematographic multi-objective camera, the combination of a film guideway, two objectives registering with the guideway and the spacing of which is equal exactly to a multiple of the spacing between two successive film pictures, a view-taking shutter including two gates, the spacing between which is equal to the spacing between the corresponding objectives, means for moving said view-taking shutter to bring periodically the two gates into register with the objectives, a shiftable selecting shutter moving in a plane parallel to the first view-taking shutter and provided with one gate adapted to selectively uncover the location of one objective according to the position assumed by the selecting shutter, a gearwork controlling the progression of the film along its guideway and the operation of the view-taking shutter, a part adapted to lock said gearwork against operation, means urging the locking part into its operative position, a presser-plate rigidly secured to the selecting shutter and parallel therewith, a film-engaging claw, a stud rigid with the selecting shutter and with the presser plate and to which said claw is pivotally secured to move in a plane perpendicular to the plane of the film in the guideway, means urging said claw into operative engagement with the film perforations, a transverse plate rigid with said selecting shutter and the presser plate and extending perpendicularly to the latter in a plane parallel to the direction of progression of the film, a lever controlling the movement of the transverse plate rigid with the selecting shutter in a direction parallel to the progression of the film, a spring urging said lever selectively into either of two extreme positions for which the gate in the selecting shutter registers with the corresponding objective, a rocker controlling the movement of said lever to shift said lever from one operative position into the other position of operation according to the setting of the rocker and common means controlling the setting of the rocker and urging the locking part and the claw into inoperative positions.

4. In a kinematographic multi-objective camera, the combination of a film guideway, two objectives registering with the guideway and the spacing of which is equal exactly to a multiple of the spacing between two successive film pictures, a view-taking shutter including two gates, the spacing between which is equal to the spacing between the corresponding objectives, means for moving said view-taking shutter to bring periodically the two gates into register with the objectives, a shiftable selecting shutter moving in a plane parallel to the first view-taking shutter and provided with one gate adapted to selectively uncover the location of one objective according to the position assumed by the selecting shutter, a gearwork controlling the progression of the film along its guideway and the operation of the view-taking shutter, a part adapted to lock said gearwork against operation, means urging the locking part into its operative position, a presser-plate rigidly secured to the selecting shutter and parallel therewith, a film-engaging claw, a stud rigid with the selecting shutter and with the presser plate and to which said claw is pivotally secured to move in a plane perpendicular to the plane of the film in the guideway, means urging said claw into operative engagement with the film perforations, a transverse plate rigid with said selecting shutter and the presser plate and extending perpendicularly to the latter in a plane parallel to the direction of progression of the film, a lever controlling the movement of the transverse plate rigid with the selecting shutter in a direction parallel to the progression of the film, a spring urging said lever selectively into either of two extreme positions for which the gate in the selecting shutter registers with the corresponding objective, a rocker controlling the movement of said lever to shift said lever from one operative position into the other position of operation according to the setting of the rocker, a push-button adapted to urge said rocker into either of its operative positions according as to whether the push-button is in its outer or in its inner position and means whereby the shifting of the push-button in either direction urges the locking part and the claw away from their operative positions.

5. In a kinematographic camera, the combination of a film guideway, two objectives registering with the guideway and the spacing of which is equal exactly to a multiple of the film picture spacing, a view-taking shutter adapted to assume a reciprocating movement over the guideway and including two gates adapted to register simultaneously with the two objectives, a shiftable selecting shutter parallel with the view-taking shutter and including a single gate adapted to selectively register with the location of one of the objectives in either of its operative positions, a mechanism controlling the progression of the film along its guideway and the operation of the view-taking shutter, a projection adapted to hold the mechanism fast against movement, a presser plate rigid with the selecting shutter, a pivot parallel with the film-engaging plane of the guideway and rigid with the selecting shutter and presser plate, a lever pivotally secured to said pivot and including a claw adapted to engage the film perforations, a further lever controlling the location of the selecting shutter in the direction of progression of the film to set said selecting shutter in either of its operative positions, a casing enclosing the two shutters and the gearwork, two push-buttons slidingly engaging the casing, a link connecting said push-buttons to constrain them to move in opposite directions, two stops carried by each of said push-buttons and adapted, upon depression of the corresponding push-button, to release the mechanism-holding projection and the claw-carrying lever respectively and means whereby the selective depression of the push-buttons shifts the further lever from one operative position into the other.

6. In a kinematographic camera, the combination of a film guideway, two objectives registering with the guideway and the spacing of which is equal exactly to a multiple of the film picture spacing, a view-taking shutter adapted to assume a reciprocating movement over the guideway and including two gates adapted to register simultaneously with the two objectives, a shiftable selecting shutter parallel with the view-taking shutter and including a single gate adapted to selectively register with the location of one of the objectives in either of its operative positions, a mechanism controlling the progression of the film along its guideway and the operation of the view-taking shutter, a projection adapted to hold the mechanism fast against movement, a presser plate rigid with the selecting shutter, a pivot parallel with the film-engaging plane of the guideway and rigid with the selecting shutter and presser plate, a lever pivotally secured to said pivot and including a claw adapted to engage the film perforations, a further lever controlling the location of the selecting shutter in the direction of progression of the film to set said selecting shutter in either of its operative positions, a casing enclosing the two shutters and the gearwork, two push-buttons slidingly engaging the casing, a link connecting said push-buttons to constrain them to move in opposite directions, stops carried by the push-buttons and adapted to act in succession upon depression of the corresponding push-buttons on the claw-carrying levtr to release the film and on the mechanism holding projection to release said mechanism and means whereby the shifting of the push-buttons in either direction shifts the further lever and thereby the selecting shutter from one operative position into the other.

7. In a kinematographic camera, the combination of a guideway for a picture film, at least two objectives registering with said guideway, the spacing between two successive objectives being equal exactly to a multiple of the film picture spacing a shiftable selecting shutter parallel with the film guideway and including a single gate adapted to selectively register with the location of one of the objectives, means controlling the movement of said shiftable shutter between two operative positions, means engaging the film and adapted to shift the latter inside the guideway by a distance equal to the travel executed by the shiftable shutter, means controlling the operative progression of the film along the guideway for view-taking purposes, and means for releasing the film engaging means with reference to the film.

8. In a kinematographic camera, the combination of a guideway for a picture film, at least two objectives registering with said guideway, the spacing between two successive objectives being equal exactly to a multiple of the film picture spacing, a shiftable selecting shutter parallel with the film guideway and including a single gate adapted to selectively register with the location of one of the objectives, means controlling the movement of said shiftable shutter between two operative positions, means engaging the film and adapted to shift the latter inside the guideway by a distance equal to the travel executed by the shiftable shutter, means controlling the operative progression of the film along the guideway for view-taking purposes, means for locking last mentioned means and means for simultaneously releasing the said locking means and the film-engaging means adapted to shift said film inside the guide way.

9. In a kinematographic camera, the combination of a guideway for a picture film, at least two objectives registering with said guideway, the spacing between two successive objectives being equal exactly to a multiple of the film picture spacing, a shiftable selecting shutter parallel with the film guideway and including a single gate adapted to selectively register with the location of one of the objectives, means controlling the movement of said shfitable shutter between two operative positions, means engaging the film and adapted to shift the latter inside the guideway by a distance equal to the travel executed by the shiftable shutter, means controlling the operative progression of the film along the guideway for view-taking purposes, means for locking last mentioned means, hand-operable means controlling the shifting of the shiftable shutter from one operative position into another and then after releasing simultaneously the locking means and the film-engaging means.

10. In a kinematographic camera, the combination of a rectilinear guideway inside which a picture film is adapted to move, at least two objectives registering with said guideway, the spacing between two successive objectives being equal exactly to a predetermined multiple of the film picture spacing, a view-taking shutter adapted to assume a reciprocating movement in front of the objectives and to uncover the different objectives simultaneously, a shiftable selecting shutter parallel with the film guideway and including a single gate adapted to register selectively with the location of one of said objectives, hand-operable means for shifting the shiftable shutter over the guideway to enter selectively one of the positions for which the single gate registers with one of the objectives, a claw movably carried by the selecting shutter and adapted to engage the film inside the guideway to shift the latter by the same distance as the shifting of the shiftable shutter, a mechanism controlling the progression of the film along the guideway for view-taking purposes together with the operation of the first shutter, means locking said mechanism against operation and means for releasing in quick succession the claw with reference to the film and the said locking means.

11. In a kinematographic camera, the combination of a rectilinear guideway inside which a picture film is adapted to move, two objectives registering with said guideway, the spacing between the said objectives being equal exactly to a predetermined multiple of the film picture spacing, a view-taking shutter adapted to assume a reciprocating movement in front of the objectives and to uncover the objectives simultaneously, a shiftable selecting shutter parallel with the film guideway and including a single gate adapted to register selectively with either objective, hand-operable means for shifting the shiftable shutter over the guideway to enter selectively one of the positions for which the single gate registers with either objective, a claw movably carried by the selecting shutter and adapted to engage the film inside the guideway to shift the latter by the same distance as the shifting of the shiftable shutter, a mechanism controlling the progression of the film along the guideway for view-taking purposes together with the operation of the first shutter, means locking said mechanism against operation and means for controlling the shifting of the shiftable shutter and associated claw and thereupon releasing in quick succession the claw with reference to the film and the said locking means.

12. In a kinematographic camera, the combination of a rectilinear guideway inside which a picture film is adapted to move, two objectives registering with said guideway, the spacing between the said objectives being equal exactly to a predetermined multiple of the film picture spacing, a view-taking shutter adapted to assume a reciprocating movement in front of the objectives and to uncover the objectives simultaneously, a shiftable selecting shutter parallel with the film guideway and including a single gate adapted to register selectively with either objective, hand-operable means for shifting the shiftable shutter over the guideway to enter selectively one of the positions for which the single gate registers with either objective, a plate rigid with the shiftable shutter and extending perpendicularly to the guideway and in parallelism with the direction of movement of the film, a claw pivotally secured to said plate and adapted to engage a perforation in the film inside the guideway to shift the latter by the same distance as the shifting of the shiftable shutter, a mechanism controlling the progression of the film along the guideway for view-taking purposes together with the operation of the first shutter, means locking said mechanism against operation and means for controlling the shifting of the shiftable shutter and associated claw and thereupon releasing in quick succession the claw with reference to the film and the said locking means.

13. In a kinematographic camera, the combination of a rectilinear guideway inside which a picture film is adapted to move, two objectives registering with said guideway, the spacing between the said objectives being equal exactly to a predetermined multiple of the film picture spacing, a view-taking shutter adapted to assume a reciprocating movement in front of the objectives and to uncover the objective simultaneously, a shiftable selecting shutter parallel with the film guideway and including a single gate adapted to register selectively with the location of one of said objectives, a plate rigid with the shiftable shutter and extending perpendicularly to the guideway and in parallelism with the direction of movement of the film, a claw pivotally secured to said plate and adapted to engage a perforation in the film inside the guideway to shift the latter by the same distance as the shifting of the shiftable shutter, a link pivotally secured to a stationary point and controlling the movement of the plate in its plane to make the shiftable shutter slide over the guideway into one of its operative positions, a spring adapted to hold said pivotal link selectively in either of its operative positions, a mechanism controlling the progression of the film along the guideway for view-taking purposes together with the operation of the first shutter, means locking said mechanism against operation, and means controlling the shifting of the pivotal link between its operative positions and thereupon releasing in quick succession the claw with reference to the film and the said locking means.

14. In a kinematographic camera, the combination of a guideway for a picture film, at least two objectives registering with said guideway, the spacing between two successive objectives being equal exactly to a multiple of the film picture spacing, a shiftable selecting shutter parallel with the film guideway and including a single gate adapted to selectively register with the location of one of the objectives, means controlling the movement of said shiftable shutter between two operative positions, means releasably engaging the film to constrain the latter to move in unison with the shiftable shutter, means controlling the operative progression of the film along the guideway for view-taking purposes independently of the location of the shiftable shutter, means for locking last mentioned means and means for simultaneously releasing the said locking means and the film-engaging means adapted to shift said film in front of the objective.

References Cited in the file of this patent

FOREIGN PATENTS

| | | |
|---|---|---|
| 289,507 | Great Britain | Apr. 23, 1928 |
| 624,467 | Germany | Jan. 21, 1936 |
| 402,171 | Italy | Feb. 20, 1943 |